United States Patent
Schuler et al.

(10) Patent No.: US 11,216,783 B2
(45) Date of Patent: Jan. 4, 2022

(54) COLLABORATIVE WORK ENVIRONMENT FOR COMPUTER-AIDED DISPATCH

(71) Applicant: MOTOROLA SOLUTIONS, INC., Chicago, IL (US)

(72) Inventors: Francesca Schuler, Palatine, IL (US); Eric Johnson, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 396 days.

(21) Appl. No.: 16/054,742

(22) Filed: Aug. 3, 2018

(65) Prior Publication Data

US 2020/0042945 A1 Feb. 6, 2020

(51) Int. Cl.
| | |
|---|---|
| *G06Q 10/10* | (2012.01) |
| *G06F 3/14* | (2006.01) |
| *G06F 3/16* | (2006.01) |
| *H04L 29/06* | (2006.01) |

(Continued)

(52) U.S. Cl.
CPC ......... *G06Q 10/103* (2013.01); *G06F 3/1454* (2013.01); *G06F 3/165* (2013.01); *G06Q 50/10* (2013.01); *G06Q 50/26* (2013.01); *H04L 65/4015* (2013.01)

(58) Field of Classification Search
CPC ...... G06Q 10/103; G06Q 10/10; G06Q 50/26; G06Q 50/10; G06F 3/1454; G06F 3/165; H04L 65/4015; G08B 25/005
See application file for complete search history.

(56) References Cited

U.S. PATENT DOCUMENTS

| | | | |
|---|---|---|---|
| 9,693,211 B2* | 6/2017 | Igumnov | ............... H04W 4/027 |
| 2006/0177034 A1* | 8/2006 | Reding | ................... H04M 3/46 |
| | | | 379/211.02 |

(Continued)

OTHER PUBLICATIONS

Whalen, Jack. (1995). A technology of order production: Computer-aided dispatch in 9-1-1 communications. (Year: 1995).*

(Continued)

*Primary Examiner* — Carrie S Gilkey
(74) *Attorney, Agent, or Firm* — Michael Best & Friedrich LLP

(57) ABSTRACT

Methods and systems for a collaborative work environment. One system includes a monitoring computer communicatively coupled to a first computer-aided workstation and a second computer-aided workstation. The monitoring computer includes an electronic processor configured to receive, from the first computer-aided workstation, a first datastream associated with a first incident, receive, from the second computer-aided workstation, a second datastream associated with at least one selected from the group consisting of a second incident and a user of the second computer-aided workstation, and analyze each of the first datastream and the second datastream to determine a collaboration recommendation. The electronic processor is further configured to transmit, to the first computer-aided workstation, a first request to participate in a collaborative work session and, to the second computer-aided workstation, a second request to participate in the collaborative work session in response to determining the collaboration recommendation.

19 Claims, 6 Drawing Sheets

(51) Int. Cl.
*G06Q 50/10* (2012.01)
*G06Q 50/26* (2012.01)

(56) References Cited

U.S. PATENT DOCUMENTS

| | | | |
|---|---|---|---|
| 2006/0211404 A1* | 9/2006 | Cromp | G06Q 10/10 |
| | | | 455/405 |
| 2007/0004389 A1* | 1/2007 | Wallace | H04L 65/403 |
| | | | 455/415 |
| 2007/0103294 A1* | 5/2007 | Bonecutter | G08B 21/10 |
| | | | 340/539.18 |
| 2008/0028323 A1 | 1/2008 | Rosen et al. | |
| 2016/0173437 A1* | 6/2016 | Bastide | G06Q 10/06311 |
| | | | 709/204 |

OTHER PUBLICATIONS

S. Venugopal, H. Li and P. Ray, "Auto-scaling emergency call centres using cloud resources to handle disasters," 2011 IEEE Nineteenth IEEE International Workshop on Quality of Service, 2011, pp. 1-9, doi: 10.1109/IWQOS.2011.5931344. (Year: 2011).*
Anna Wu et al.: "Supporting collaborative sense-making in emergency management through geo-visualization", International Journal of Human-Computer Studies, vol. 71, No. 1, Jan. 1, 2013, pp. 4-23. XP055152781, ISSN: 1071-5819 (20 pages).
International Search Report & Written Opinion for related International Application No. PCT/US2019/044401 dated Nov. 5, 2019 (16 pages).

* cited by examiner

COLLABORATIVE WORK ENVIRONMENT FOR COMPUTER-AIDED DISPATCH

BACKGROUND OF THE INVENTION

Law enforcement and other public safety personnel respond to incidents in the course of their duties. Responding to incidents often involves collecting myriad pieces of information (for example, police reports, evidence, witness reports, video and other media assets, and the like) related to the incident response. This produces large document and information collections. These collections are navigated by personnel during the occurrence of an incident and in subsequent investigations or incident reconstructions. Public safety and other personnel may not be able to handle collections efficiently or accurately by themselves.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
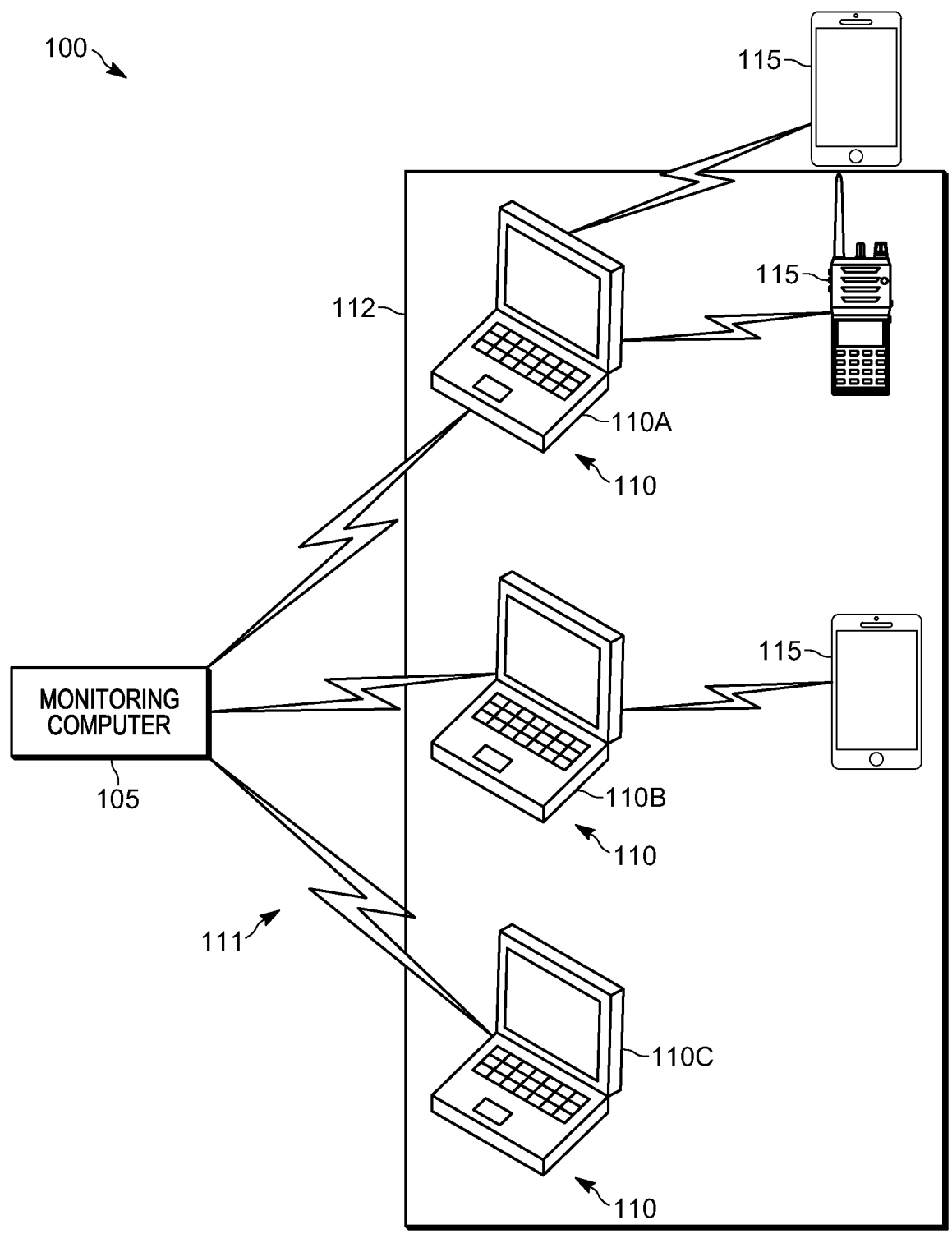
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptops, desktop computers, phones (for example, cellular or satellite), devices with an interactive display, and other communication devices may be a part of a console used by an operator (for example, a public safety dispatcher). In some embodiments, the console is referred to as a computer-aided workstation. The collaborative work environment system includes one or more workstations each used by a different operator. In some situations, the operator is one or a combination of an emergency call-taker such as a 911 call-taker, computer-aided dispatcher, voice dispatcher, and intelligence analyst. Each operator role includes different responsibilities and, correspondingly, access to different resources and applications. For example, an emergency call-taker receives a data feed (for example, voice call, live or recorded video feed, text message, and the like) from a citizen, identifies an incident based on the data feed, and decides how to respond to the data feed to help the citizen and handle the incident. For example, the emergency call-taker may identify an incident and transfer the data feed accordingly. For example, the call-taker may transfer the data feed to a different agency (for example, animal control), take no action (for example, when the data feed is a prank call or an accidental call), transfer the data feed to the console of an incident-handling dispatcher, and the like.

In some situations, a workstation of an operator receives one or more data feeds from citizens in response to a call taker using a call-taking device to transfer the one or more data feeds to the workstation of the operator. In some situations, the operator is temporarily assigned to an incident in which officers are supervising, maintaining, providing assistance, and the like (for example, a concert, a sporting event, management of a theme park or other entertainment venue, and the like). In some embodiments, the incident is a public safety incident in which public safety officers (police officers, firefighter, paramedics, and the like) are called to a location to provide assistance in resolving or preventing a societal or environmental problem (for example, a location where a suspect is committing or has committed a crime, a fire, a vehicular accident, a traffic stop, and the like). An incident may also be an emergency situation involving an injury to a person, a natural disaster, or some other situation in which officers are supervising, maintaining, providing assistance, and the like such as a concert, a sporting event, management of a theme park or other entertainment venue, and the like. In some embodiments, the workstation of the incident-handling operator additionally or alternatively receives one or more data feeds from the officers handling the incident (for example, employees of a theme park; security guards at a concert or sporting event; public safety officers such as police officers, firefighters, and paramedics; and the like). For example, the console of an incident-handling dispatcher receives a video feed or an image feed from one or more of a dash camera of a vehicle, a body-worn camera of an officer, and a traffic camera.

Call-takers, computer-aided dispatch (CAD) operators, intelligence analysts, and the like (herein collectively referred to as emergency operators) that handle emergency calls (for example, 911 calls) and incidents may not always be within the same vicinity of each other. Such personnel may not be in the same location and may be dispersed across multiple local areas and jurisdictions. For example, in some instances, calls that are routed to the same public safety answering point may be answered by both local and remote CAD operators or CAD operators that are of different answering points.

Emergency operators may not have means to identify when they are working on a common incident and may create duplicate incident records with redundant information. Similarly, when emergency operators are in different jurisdictions, one jurisdiction may be overloaded with high call traffic while the other may have capacity to handle calls. However, the emergency operators of different jurisdictions may not know of each other's workload. Furthermore, emergency operators may not have means to collaborate with each other. Accordingly, systems and methods are provided herein for, among other things, a collaborative work environment system for handling calls for service (for example, public safety calls).

Disclosed are, among other things, a method, device, and system for one or more electronic processors to provide a collaborative work environment between two or more workstations, each of which is operated by an operator of a particular role. In some embodiments, the one or more electronic processors analyze data from each of the two or more workstations to determine a collaboration recommendation and transmit, to the two or more workstations, a request to participate in a collaborative work session. The one or more electronic processors generate, in response to receiving an acceptance to the request from the two or more workstations, a collaborative work session between the two or more workstations. The disclosed method, device, and system address the above-noted technological problem by improving the interaction between emergency operators that handle public safety calls. In other words, the disclosed method, device, and system present a collaborative work interface between the two or more workstations, when the method, device, and system determines that the one or more operators of the workstations may benefit from working with each other. Thus, the disclosed method, device, and system provides a mechanism for handling high call traffic and improves call-handling efficiency between the two or more workstations.

One embodiment provides a collaborative work environment system for handling public safety communications, the system including a monitoring computer communicatively coupled to a first computer-aided workstation and a second computer-aided workstation. The monitoring computer includes an electronic processor configured to receive, from the first computer-aided workstation, a first datastream associated with a first incident, receive, from the second computer-aided workstation, a second datastream associated with a second incident, and analyze each of the first datastream and the second datastream to determine a collaboration recommendation. The electronic processor is further configured to transmit, to the first computer-aided workstation and the second computer-aided workstation, a request to participate in a collaborative work session in response to determining the collaboration recommendation.

Another embodiment provides a method for providing a collaborative work environment system for handling public safety communications between a first computer-aided workstation and a second computer-aided workstation, the method includes receiving, from the first computer-aided workstation, a first datastream associated with a first incident, receiving, from the second computer-aided workstation, a second datastream associated with at least one selected from the group consisting of a second incident and a user of the second computer-aided workstation, analyzing each of the first datastream and the second datastream to determine a collaboration recommendation, and transmitting, to the first computer-aided workstation and the second computer-aided workstation, a request to participate in a collaborative work session in response to determining a collaboration recommendation.

Another embodiment provides a non-transitory computer-readable medium including instructions executable by an electronic processor to perform a set of functions. The set of functions include receiving, from a first computer-aided workstation, a first datastream associated with a first incident, receiving, from the second computer-aided workstation, a second datastream associated with at least one selected from the group consisting of a second incident and a user of the second computer-aided workstation, analyzing, via the electronic processor, each of the first datastream and the second datastream to determine a collaboration recommendation, and transmitting, to the first computer-aided workstation and the second computer-aided workstation, a request to participate in a collaborative work session in response to determining a collaboration recommendation.

It should be understood that the system, method, and device described herein, while examples described below are in regard to a public safety center or dispatch center environment, are not limited to a public safety/dispatch center environment and may be applied, in further embodiments, to similar communication centers and systems, for example a customer service center.

FIG. 1 is a block diagram of a collaborative work environment system (communication system) 100 according to one example embodiment. The system 100 includes a monitoring computer 105 communicatively coupled to various computer-aided workstations 110A through 110C. In the following description, when explaining how a single workstation functions, a reference to workstation 110 is used.

Figure 3:
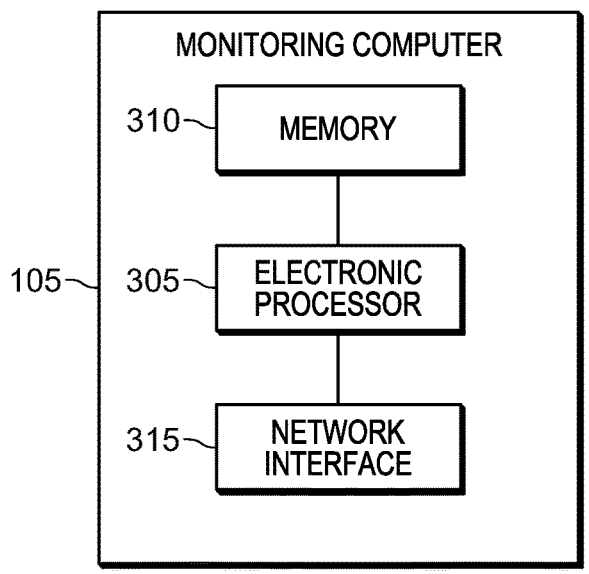
FIG. 3 is a block diagram of a monitoring computer included in the communication system of FIG. 1 according to one example embodiment.

The monitoring computer 105, described more particularly below with respect to FIG. 3, is communicatively coupled to the plurality of workstations 110A-110C via a communications network 111. The monitoring computer 105 may be implemented as a stand-alone device (for example, a server) or distributed across one or more electronic processing devices (for example the workstations 110A-110C). In some embodiments, the monitoring computer 105 may be implemented as a cloud-based server, application, or a combination of both (for example, operating on one or more virtual servers). The communications network 111 may include wireless connections, wired connections, or both. The communications network 111 may be implemented using a local area network, such as a Bluetooth™ network or Wi-Fi, a wide area network, such as the Internet, a wireless accessory Personal Area Network (PAN), a Machine-to-machine (M2M) autonomous network, and a public switched telephone network, and other networks or combinations of networks including a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, and a 3G, 4G, or 5G network. Derivatives of such networks and other suitable networks, including future-developed networks may also be used.

The workstation 110 includes a dispatch console and is used by a user. A user may be, for example, an operator (as described above). The workstation 110, described in more detail below in regard to FIG. 2, may be one or more electronic communication devices similar to the example communication devices 115 described below. For example, the workstation 110 may include a laptop, desktop computer, or both. The workstation 110 is configured to send and receive data to and from the monitoring computer 105 (via the communications network 111). As indicated by FIG. 1, the workstation 110 may be configured to communicate with one or more communication devices 115. The one or more communication devices 115 may include any one of a number of different types of network-connectable devices. For example, the communication device 115 may be a portable communication device carried by an officer during patrol (for example, an employee of a theme park; a security guard at a concert or sporting event; a public safety officer such as police officer, firefighter, and paramedic; and the like). In some embodiments, communication device 115 is a smart phone, a battery powered portable radio, a body wearable camera, a biometric sensor, or similar device. As another example, communication device 115 is a laptop computer that can receive input from a user via a keyboard or touchscreen display. In other embodiments, communication device 115 is a tablet, a desktop computer, or a similar device. As another example, communication device 115 may be a vehicular mobile communication device (for example, a police vehicle, a fire truck, an ambulance, and the like), a video surveillance system, or both. The workstation 110 may receive captured images, video, audio, and other data related to incidents. The workstation 110 may further be configured to transmit such data to the monitoring computer 105 over the communication network 111.

In some embodiments, each of the workstations 110 is associated with a command center. For example, as illustrated in FIG. 1, the workstations 110A-110C are associated with a command center 112. The command center 112 is a public safety command center such as a police headquarters, fire station, answering point, public safety access point, private security control center, or dispatch center. In some embodiments, one or more of the communication devices 115 are associated with the command center 112. In the following description, when explaining communications to or from the command center 112, it should be understood that the communications occur to or from one or more of the communication devices 115, both outside the command center 112 (for example, a device used by a civilian) and included in the command center 112. Each command center may be associated with one or more public safety management agencies. In some embodiments, one or more of the workstations 110 may be associated with different agencies.

Also as shown in FIG. 1, in some embodiments, the monitoring computer 105 receives, from each of the workstations 110, a datastream. The datastream includes operational information of the particular workstation 110 (for example, operator information, incident record information, and the like). The datastream may also include information (as explained above) received from one or more communication devices 115. As explained in more detail below in regard to FIG. 3, the monitoring computer 105 is configured to analyze the datastreams in order to determine when to implement a collaborative work session between two or more of the workstations 110.

Figure 2:
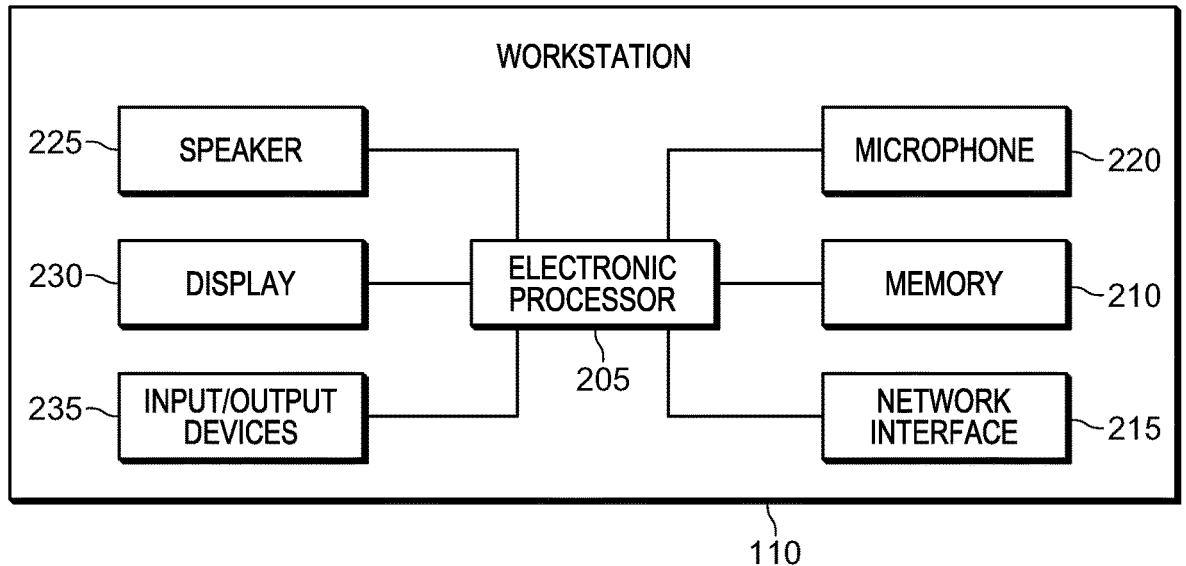
FIG. 2 is a block diagram of a workstation included in the communication system of FIG. 1 according to one example embodiment.

FIG. 2 is a block diagram of a workstation 110 according to one example embodiment. In the embodiment illustrated, the workstation 110 includes an electronic processor 205 (for example, a microprocessor or other electronic device). The electronic processor 205 includes input and output interfaces (not shown) and is electrically coupled to a memory 210, a network interface 215, a microphone 220, a speaker 225, and a display 230. In some embodiments, the workstation 110 includes fewer or additional components in configurations different from that illustrated in FIG. 2. For example, the workstation 110 may additionally include a push-to-talk button or a camera. As another example, the workstation 110 may include one or more additional input devices (as well as output devices) 235 such as a computer mouse or a keyboard that receives inputs from a user of the workstation 110. In some embodiments, the components of the workstation 110 are dispersed over several electronic devices. In other embodiments, some or all of the workstation 110 may be implemented virtually (for example, the memory 210 may be implemented as a cloud-based storage).

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from the monitoring computer 105. In some embodiments, the network interface 215 includes one or more transceivers for wirelessly communicating with the monitoring computer 105, the network 111, or both. Alternatively or in addition, the network interface 215 may include a connector or port for receiving a wired connection to the monitoring computer 105, the network 111, or both such as an Ethernet cable. The electronic processor 205 may receive one or more data feeds (for example, a video feed, an audio feed, an image feed, a text feed, a sensor input data feed, and the like) from the one or more communication devices 115 (for example, data feeds generated by one or more communication devices 115). In some embodiments, the electronic processor 205 receives data through the network interface 215 directly from a communication device 115. In some embodiments, communication of data feeds occur in approximately real-time. The electronic processor 205 may communicate data generated by the communication device 115 over the network 111 through the network interface 215, such as for receipt by the monitoring computer 105, the one or more communication devices 115, or both. For example, the electronic processor 205 receives electrical signals representing sound from the microphone 220 and may communicate information relating to the electrical signals over the network 111 through the network interface 215 to other devices, for example, to the monitoring computer 105. Similarly, the electronic processor 205 may output the one or more data feeds received from the network 111 through the network interface 215, for example from a communication device 115, through the speaker 225, the display 230, or a combination thereof.

The display 230 displays images, video, text, and data from sensor inputs to the user (for example, an incident-handling dispatcher). The display 230 may be a liquid crystal display (LCD) screen or an organic light emitting display (OLED) display screen. In some embodiments, a touch sensitive input interface may be incorporated into the display 230 as well, allowing the user to interact with content provided on the display 230. In some embodiments, the speaker 225 and the display 230 are referred to as output devices that present data feeds to an operator of the workstation 110 (for example, an incident-handling dispatcher). In some embodiments, the microphone 220, a computer mouse, a keyboard, and a touch-sensitive display are referred to as input devices that receive input from a user of the workstation 110.

FIG. 3 is a block diagram of the monitoring computer 105 according to one example embodiment. The monitoring computer 105 includes an electronic processor 305 electrically connected to a memory 310 and a network interface 315. These components are similar to the like-named components of the workstation 110 explained above with respect to FIG. 2 and function in a similar manner as described above. In some embodiments, the monitoring computer 105 includes fewer or additional components in configurations different from that illustrated in FIG. 3. For example, the monitoring computer 105 may additionally include a display such as a touch screen to allow a user to reprogram settings of the methods described below. In some embodiments, the monitoring computer 105 performs functionality other than the functionality described below. In some embodiments, the components of the monitoring computer 105 are dispersed over several electronic devices. In further embodiments, some or all of the monitoring computer 105 may be implemented virtually (for example, the memory 310 may be implemented as a cloud-based storage).

As explained in greater detail below, the monitoring computer 105 is configured to receive one or more datastreams from one or more workstations 110. As explained in more detail below in regard to FIG. 4, the monitoring computer 105 is configured (for example, via software, hardware, or combination of both) to analyze the one or more datastreams for a collaboration recommendation and generate a collaborative work session between the two or more workstations 110.

As explained above, a workstation 110 of an operator (in other words, a console) may receive one or more data feeds from citizens (for example, voice call, live or recorded video feed, text message, and the like) from a communication device 115. The workstation 110 may additionally or alternatively receive one or more data feeds from officers handling the incident (for example, security guards at a concert or sporting event; public safety officers such as police officers, firefighters, and paramedics; and the like). For example, the workstation 110 of the operator receives one or more of a video feed or an image feed from one or more of a dash camera of a vehicle, a body-worn camera of an officer, and a traffic camera. As another example, the workstation 110 of the operator receives a sensor input data feed from a biometric sensor that monitors biometric data of an officer.

As explained above, the operators of a single command center 112 may not be able to effectively handle calls when there is high call traffic at the single command center 112. Operators of another control center may have low call traffic but techniques to balance the load and communicate between controllers experiencing high call traffic and those experiencing low call traffic are under developed. Similarly, there is currently no effective system to alert operators handling separate calls that they are working on a same incident. Thus, there is a technological problem with respect to the interaction between incident handling operators.

Figure 4:
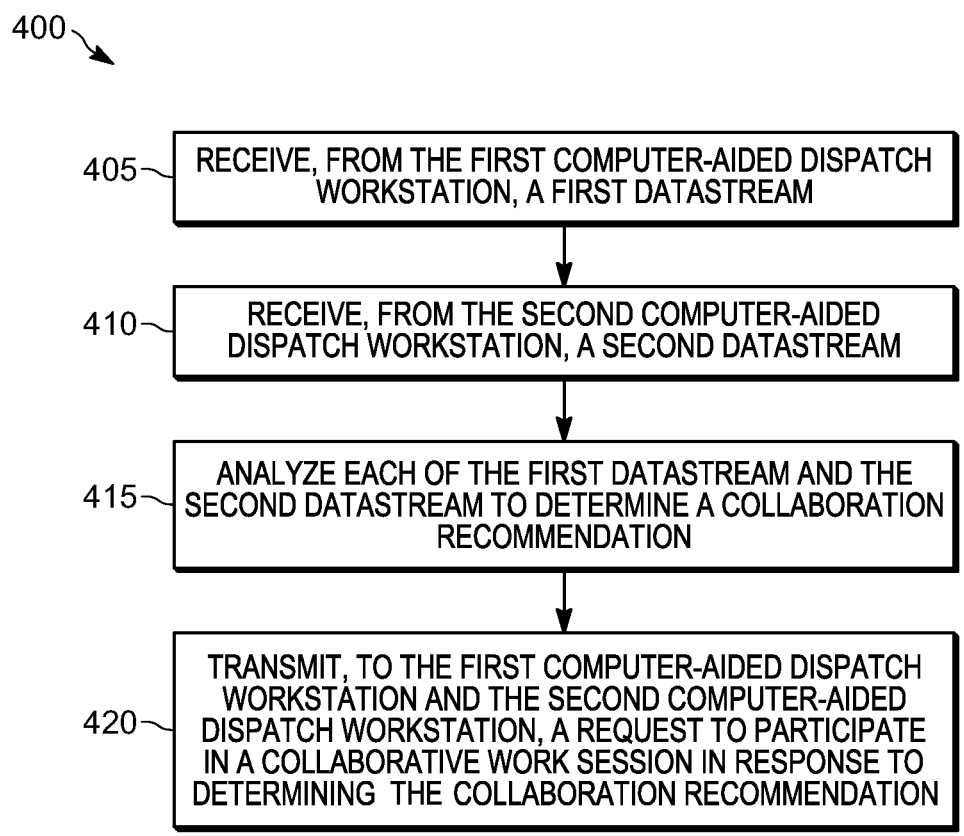
FIG. 4 is a flowchart of a method for providing a collaborative work session between two or more workstations of the communication system of FIG. 1 according to one example embodiment.

To address this technological problem, the monitoring computer 105 described above performs, in one instance, one or more of the improved methods explained below. For example, a method 400 of FIG. 4 is executed by the monitoring computer 105 to determine when to propose and provide, the users (operators) of two or more workstations 110, a collaborative work session. The method 400 addresses the above-noted technological problem by, for example, improving the interaction between operators via a shared multi-user interface that allows collaborative access and editing of incident records and access to further resources (for example, related documents, contacts, and data feeds). As further explained below, the method 400 analyzes data from each of the workstations 110 in order to determine when it may be useful for the operators of two or more workstations 110 to work together in a collaborative work session and suggest to the one or more operators of the workstations 110 to use the collaborative work session. The monitoring computer 105 may be further configured to improve the determination of when to suggest a collaboration session between operators by analyzing one or more of the datastreams from the workstations 110 for a reason that an operator rejected joining a collaborative work session or exits the collaborative work session prematurely. Thus, the method 400 may improve the efficiency of call and incident handling of an operator. For ease of description, the method 400 is described below in terms of a first workstation 110A and a second workstation 110B. However, as noted above, some or all parts of the methods performed by the monitoring computer 105 may be performed in regard to more than two workstations 110 located at one or more separate geographic locations and at one or more separate agencies.

FIG. 4 illustrates a flow chart of the method 400 performed by the monitoring computer 105 for determining whether to present a request to initiate a collaborative work session between two or more workstations 110. While a particular order of processing steps, message receptions, and message transmissions is indicated in FIG. 4 as an example, timing and ordering of such steps, receptions, and transmissions may vary where appropriate without negating the purpose and advantages of the examples set forth in detail throughout the remainder of this disclosure. As an example, the method 400 is described as being performed by the monitoring computer 105, in particular, in terms of the electronic processor 305. However, it should be understood that in some embodiments, portions of the method 400 are performed external to the monitoring computer 105 by other devices, including for example, one or more of the workstations 110 and the communication devices 115. It should also be understood that the term "user" used herein refers to a user of a workstation 110 (for example, an operator assigned a particular role including one or more of a public safety or 911 call-taker, computer-aided dispatch (CAD) operator, intelligence analyst, and the like).

The electronic processor 305 receives, via the network 111, a first datastream from a first workstation 110A (at block 405) and a second datastream from a second workstation 110B (block 410). As explained above, each datastream includes operational information of the particular workstation 110 (for example, operator information, incident information, data feed information, and the like). Operator information may include a user profile (a digital profile of the user), a role of a user (for example, call-taker, intelligence analyst, etc.), a call/incident handling history, a workload of the user (how many calls, incidents, or both are they assigned to/handling) and the like. In some embodiments, the user profile may also include an authorization level of a user. Incident information includes information regarding an incident that the user is currently handling (for example, an incident record number, an incident type, an incident location, incident participants, and the like). In some embodiments, the incident information further includes an incident handling process step (in other words, where a user is at in creating or modifying an incident record). The data feed information may include one or more data feeds associated with the incident including one or more of a video feed, an audio feed, an image feed, a text feed, and a sensor input data feed. As explained above, the one or more data feeds may be initially received by the workstation 110 from one or more communication devices 115 used by citizens (for example, a smart phone) or officers such as public safety officers (for example, a portable radio carried by an on-duty police officer, a dashboard camera of a police vehicle, a body-worn camera of a police officer, and the like).

At block 415, the electronic processor 305 analyzes each of the first datastream and the second datastream to determine a collaboration recommendation. In other words, the monitoring computer 105 analyzes and compares information received from the workstations 110 in order to determine when a collaborative work session may be useful or should be recommended to the users of two or more workstations 110. The determination of a collaboration recommendation may be based on one or more of an incident content, a complementary role between two or more users, an incident workflow, and an incident workload.

The incident content relates to a particular incident that the user of the workstation 110 is currently handling. A collaboration recommendation may be determined between two or more workstations 110 when the monitoring computer 105 determines that the users of the two or more workstations 110 are working on, or are most likely working on (for example, such as 60 or 80% certainty or 60 or 80% similar characteristics), the same (or related) incident(s). A related incident is an incident that is at the same location as the other incident, a result of the other incident, or a combination of both. For example, a related incident to a robbery may be a car jacking performed by the robber of the first incident. In some embodiments, the monitoring computer 105 is also configured to recommend a collaborative work session between at least two workstations 110 based on details of the incident received from the datastream from the workstation 110. Such details may include a scale of the incident (for example, a number of people involved in, a number of proprieties involved in, or a geographic size of the incident), a type of incident, a severity of the incident, a number of data feeds related to the incident, and the like. The monitoring computer 105 determines a collaboration recommendation when the monitoring computer 105 determines that an incident being handled by a user may more efficiently and effectively be handled with the help of a second user. For example, a robbery involving multiple injuries may be more complicated for a single person to handle than a call regarding a noise disturbance. As a result, the monitoring computer 105 may determine a collaboration recommendation between the user handling the robbery incident and one or more additional users that have the resources (for example, as described below, workload capacity) to help the user handle the multiple related incidents.

In some embodiments, the monitoring computer 105 determines if an incident handled at the first workstation 110A is the same (or related to) as, or is most likely the same (or related to) as (for example, such as 60 or 80% certainty or 60 or 80% similar characteristics, an incident being handled at the second workstation 110B based on information received from a communication device 115 after an incident record is created at either or both of the workstations 110A and 110B. The monitoring computer 105 determines if an incident being handled at the first call station is likely the same or related based on comparing the incident type, incident location information, and additional incident information from the corresponding incident record created or populated at each of the workstations 110 by a user. In some embodiments, the monitoring computer 105 determines an incident type based on information included in the datastreams. In some embodiments, the monitoring computer 105 determines the incident type by analyzing information included the datastream using a natural language processing engine, image recognition techniques, video recognition techniques, text recognition techniques, and the like. For example, the monitoring computer 105 determines that the incident type is a fire when the monitoring computer 105 determines that an image feed or a video feed includes an image including flames using image or video recognition techniques. As another example, the monitoring computer 105 determines that the incident type is vehicular accident when the natural language processing engine of the electronic computing device recognizes the words "car accident" in a received audio feed or text message. In some embodiments, the monitoring computer 105 determines the incident type based on the type of sensor from which a sensor input data feed (from a communication device 115) within the datastream is received. For example, when a smoke detector or fire alarm transmits a signal indicating that the smoke detector or fire alarm has been triggered, the monitoring computer 105 determines that the incident type is a fire.

In some embodiments, with respect to data feeds received from communication devices 115 of citizens and public safety officers, the monitoring computer 105 determines that received data feeds are associated with the same incident based on information received from the users of the workstations 110A and 110B respectively, information included in the data feeds, and information received along with the data feeds (for example, metadata including codes that represent incident type, location information, time stamps, and the like). In response to determining that a data feed received at the first workstation 110A is associated with an incident in which other data feeds have been previously received and are currently being received by another workstation 110B, the monitoring computer 105 determines a collaboration recommendation between the first and second workstations 110A and 110B.

An incident workflow may also be used in some instances in the determination of a collaboration recommendation. An incident workflow provides an indication of the step or point of processing in an incident management handling process. It may, from a user's perspective, be viewed as providing an indication of the particular processing step currently being performed or evaluated by a user. A collaboration recommendation may be made between workstations 110A and 110B when the user of the first workstation 110A is in the middle of handling an incident and has already created and entered details into an incident record when the user of the second workstation 110B has received an additional call relating to the same or a related incident and has just started to create, or has just created, an incident record. Alternatively, the user of the second workstation 110B may just be completing a second incident record (for example, an incident that is unrelated to the incident being handled at the first workstation 110A) and thus soon be available to handle another incident. In contrast, in some embodiments, when both users of the first and second workstations 110A and 110B are each already busy handling or finishing up separate, unrelated incidents, no recommendation for a collaborative work session may be made because it may be disruptive or complicated for both users to initiate a collaborative work environment when both users are already involved in handling separate incidents.

Incident workload relates to the number of calls assigned to and the number incidents a user of the workstation 110 is handling. The incident workload may also relate to the number of calls a control center has received and the number of incidents a control center is currently handling. In some examples, a collaboration recommendation is made between the first workstation 110A and the second workstation 110B when the monitoring computer 105 determines that the workload of the first workstation 110A is high while the workload of the second workstation 110B is low. For example, the monitoring computer 105 determines a collaboration recommendation when the workload (number of calls, incidents, or a combination of both assigned to a user) of the first workstation 110A exceeds, or is about to exceed, a maximum handling incident number threshold while the workload of the second workstation 110B fails to exceed a minimum handling incident number threshold. Similarly, the monitoring computer 105 determines a collaboration recommendation when the workload of a command center 112 (the number of calls, incidents, or both the control center is currently handling, receiving, or both) the first workstation 110A is associated with exceeds, or is about to exceed, a maximum handling incident number threshold while the workload of a second command center 112 that the second workstation 110B is associated with fails to exceed a minimum handling incident number threshold.

In some cases, a user of a workstation 110 may be overwhelmed with an amount of information related to a particular incident and thus may not be able to handle the call efficiently. Accordingly, in some embodiments, the incident workload may also relate to an amount of information regarding an incident being handled by a user of a workstation 110. A collaboration recommendation may be determined, or made, between the first workstation 110A and the second workstation 110B when the monitoring computer 105 determines a number of data feeds associated with the incident received at the first workstation 110A exceeds a data feed threshold. In other embodiments, the monitoring computer 105 determines when a number of data feeds of a particular type (for example, media types such as video data, audio data, and sensor input data or content types such as injuries or other stressful content) associated with the incident that are transmitted to the workstation 110A exceeds a particular threshold. As mentioned above, in some embodiments, the data feeds are received by the workstation 110A and forwarded to the monitoring computer 105 in real-time (for example, a live voice call, a live video feed, and the like).

In some embodiments, the electronic processor 305 is further configured to determine the collaboration recommendation based on the role of the users of the workstations 110A and 110B. A collaboration recommendation is determined or made when the roles of the users are the same (for example, when one user is a dispatcher and the other user is also a dispatcher) or complementary (for example, when one user is a dispatcher and the other user is an intelligence operator). In other embodiments, the electronic processor 305 also determines the collaboration recommendation based on a stored authorization level of the users of the workstations 110A and 110B. For example, when a user does not have authorization to participate in a collaborative work session, a collaboration recommendation may not be made.

As described above, the collaboration recommendation is determined based on one or more factors, including those described above. At block 420, the electronic processor 305 transmits, to the first computer-aided workstation 110A and the second computer-aided workstation 110B, a request to participate in a collaborative work session in response to determining a collaboration recommendation. The request may be displayed on the display 230 of the workstations 110A and 110B, for example as a graphical user interface element (for example, an alert box or window). For ease of description, the graphical user interface element is referred to herein as a graphical element. As described in more detail below in regard to FIGS. 5-7, the collaborative work session is generated by an application that provides collaborative access and editing of incident records and access to further resources (for example, related documents, contacts, and data feeds). This allows users of two or more workstations 110 to work together on the same or related incident(s) via a shared graphical user interface.

In some embodiments, the request includes an option for the workstation 110 to connect to a collaborative work session (for example, a user-selectable graphical "accept" button indicating, when selected, that the user of the workstation 110 wishes to participate in a collaborative work session). The request may also include an option for the workstation 110 to reject or not connect to the collaborative work session (for example, a user-selectable graphical "reject" button indicating, when selected, that the user of the workstation 110 does not wish to participate in a collaborative work session). In some embodiments, the request includes information regarding the incident being handled by the user of the other workstation(s) 110 that were sent a request to participate in the collaborative work session. The information included in the request may include, for example, a name of the other user, a role of the other user, an incident record identifier indicating the incident that the other user is handling, one or more of the resources that the other user has access to, and the like. Information included in the request may be displayed on the display 230 so that the user of a workstation (for example, workstation 110A) may verify that the incident(s) being handled at the other workstation(s) (for example, workstation 110B) is the same or related to the incident the user is currently handling. The information included in the request may also be used to determine the roles of the other workstation users. In some embodiments, the request is for a workstation 110 to participate in a current collaborative work session that two or more other workstations 110 are participating in.

The workstation 110 receives, via an input device of the workstation 110, a selection of an item included in the request indicating whether to accept or reject the request to participate in the collaborative work session. For example, when the display 230 is a touch screen, the workstation 110 receives a user input via the touch screen indicating a selection of one of an acceptance to participate in the collaborative work session or a rejection to participate in the collaborative work session. As another example, the workstation 110 receives an input via a mouse operated by a user of the workstation 110. As explained in more detail below, in response to the acceptance, the monitoring computer 105 provides a collaborative work session between the one or more workstations 110.

In response to receiving an acceptance from both the first and second computer-aided workstations 110A and 110B, the electronic processor 305 generates a collaborative work session between the first and second computer-aided workstation 110B. As mentioned above and described in more detail below in regard to FIGS. 5-7, the collaborative work session is, in one example, generated by an application that provides collaborative access and editing of incident records and access to further resources (for example, related documents, contacts, and data feeds). This allows users of two or more workstations 110 to work together on the same incident, or related incidents, via a shared graphical user interface and, together, the two or more users are able to edit and complete a common incident record or individual related incident records. Depending on the roles of the users involved, as shown below in regard to FIG. 7, the collaborative work session allows a user access to one or more resources that they normally would not have access to as well as share notes and common documents and information onscreen with the one or more other users participating in the collaborative work session. Users may also be given access to one or more communication interfaces, contacts, or both that (due to their user role) the users normally do not have access to. This additional access often helps improve efficient handling of an incident.

In some embodiments, the electronic processor 305 is configured, in response to receiving a rejection of the request from one or more of the workstations 110, to analyze a reason for the rejection. For example, the electronic processor 305 may be configured to transmit a questionnaire request to the workstation 110 asking the user of the workstation 110 to answer why the user rejected the request. The questionnaire request may be displayed on the display 230 of the workstation 110. In some embodiments, the electronic processor 305 transmits the questionnaire request to another electronic device (for example, via text to a cellphone or an electronic message to an email account) associated with the user of the workstation 110. The electronic processor 305, in response to receiving an answer to the questionnaire request, analyzes the answer for a reason the request to participate in the collaborative work session was rejected and modifies one or more algorithms used by the electronic processor 305 (for example, using machine learning) in the determination of the collaboration recommendation based on the reason. Similarly, the electronic processor 305 is, in some examples, configured to detect when one or more of the workstations 110 participating in the collaborative work session leaves the session prematurely, analyze the datastreams of the one or more workstations 110 (and, in some embodiments, transmit the questionnaire request) to determine a reason for the one or more workstations 110 leaving, and modify one or more algorithms used by the electronic processor 305 in the determination of the collaboration recommendation based on the reason. For example, the electronic processor 305 may modify a stored mapping or machine learning neural network algorithms, processes, or both used in the determination of the collaboration recommendation.

Figure 5:
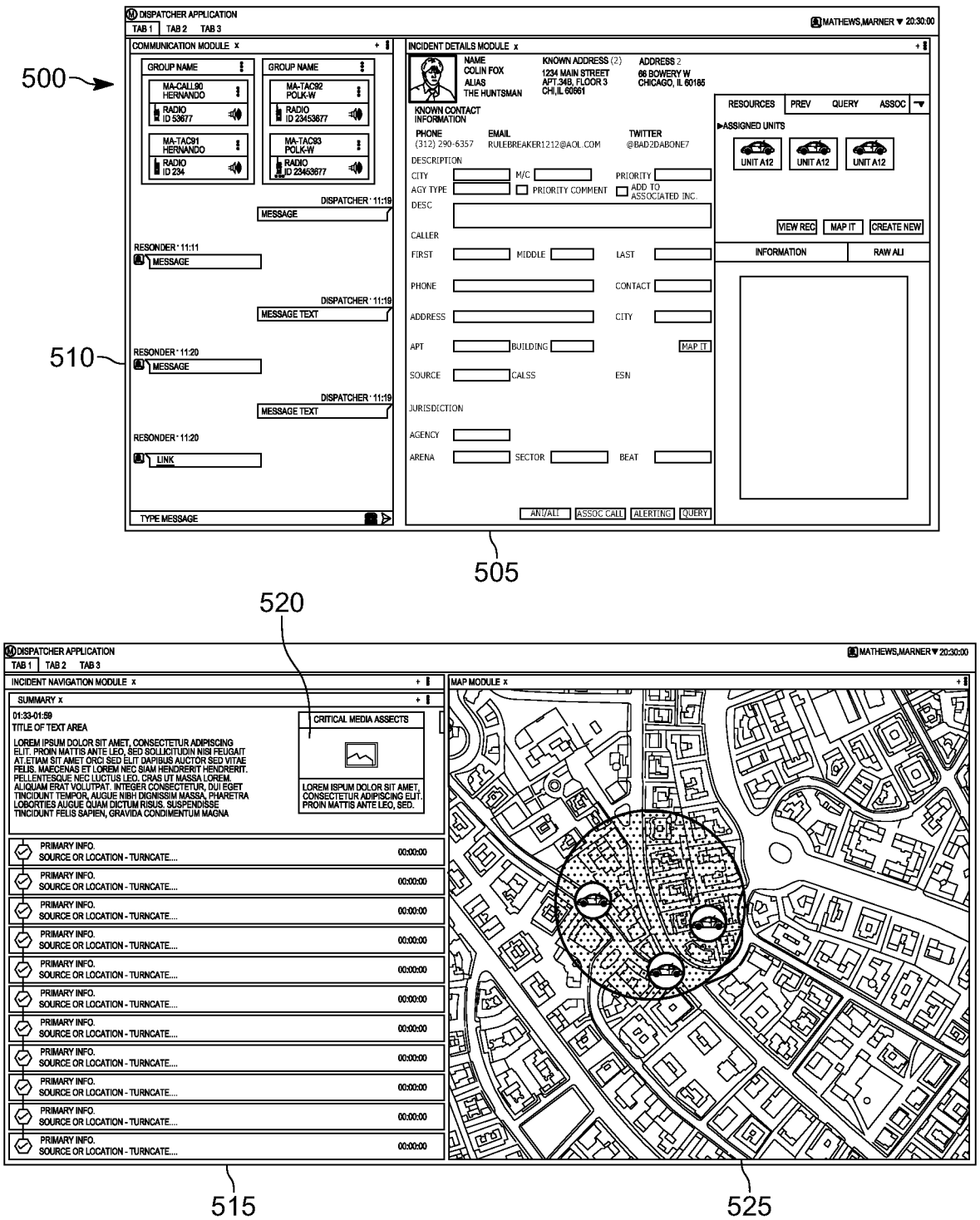
FIG. 5 illustrates a graphical user interface of a workstation of the communication system of FIG. 1 according to one example embodiment.
Figure 6:
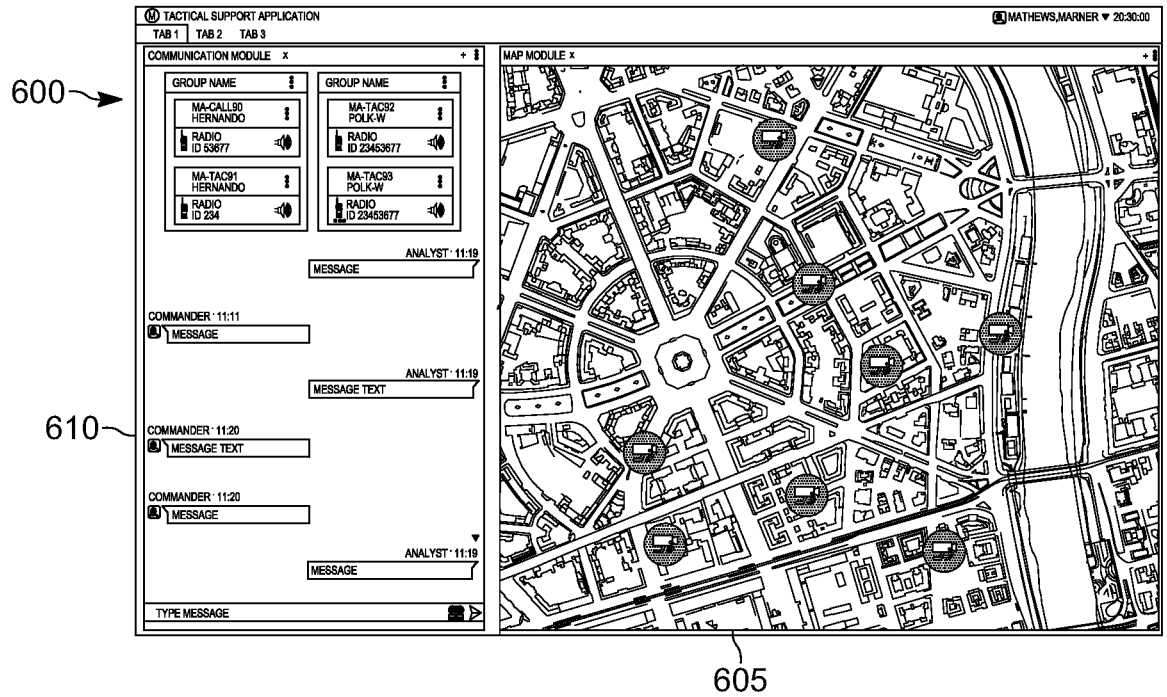
FIG. 6 illustrates a graphical user interface of a workstation of the communication system of FIG. 1 according to one example embodiment.
Figure 6:
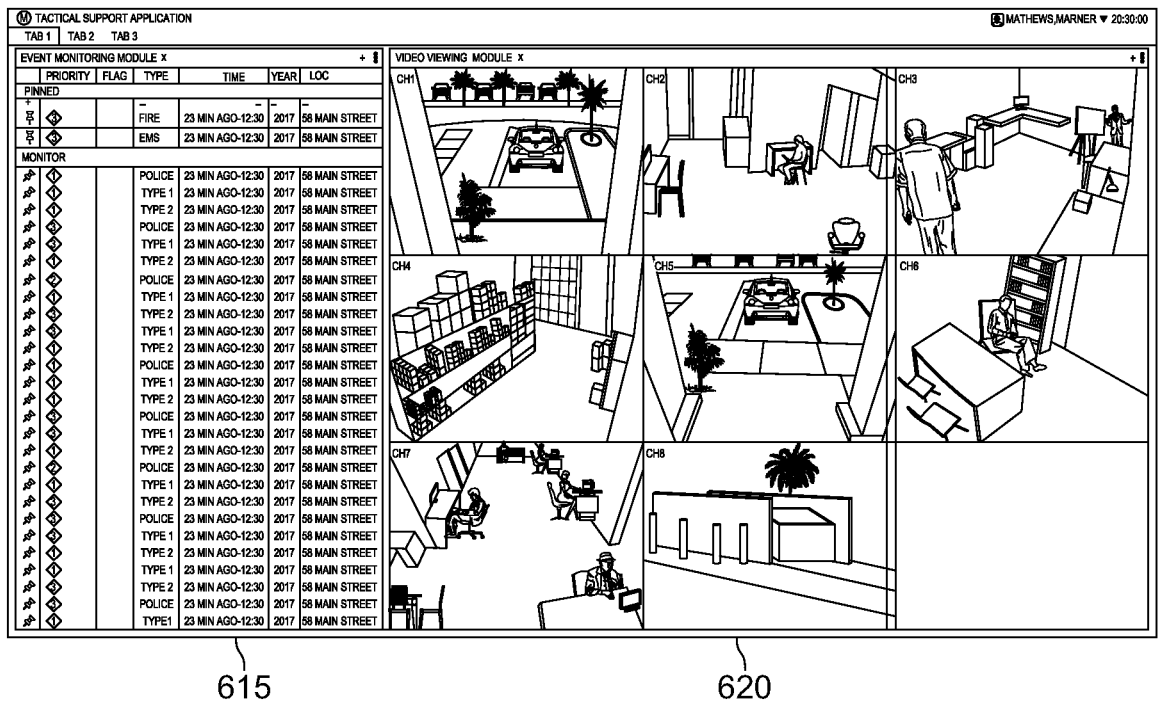
Figure 7:
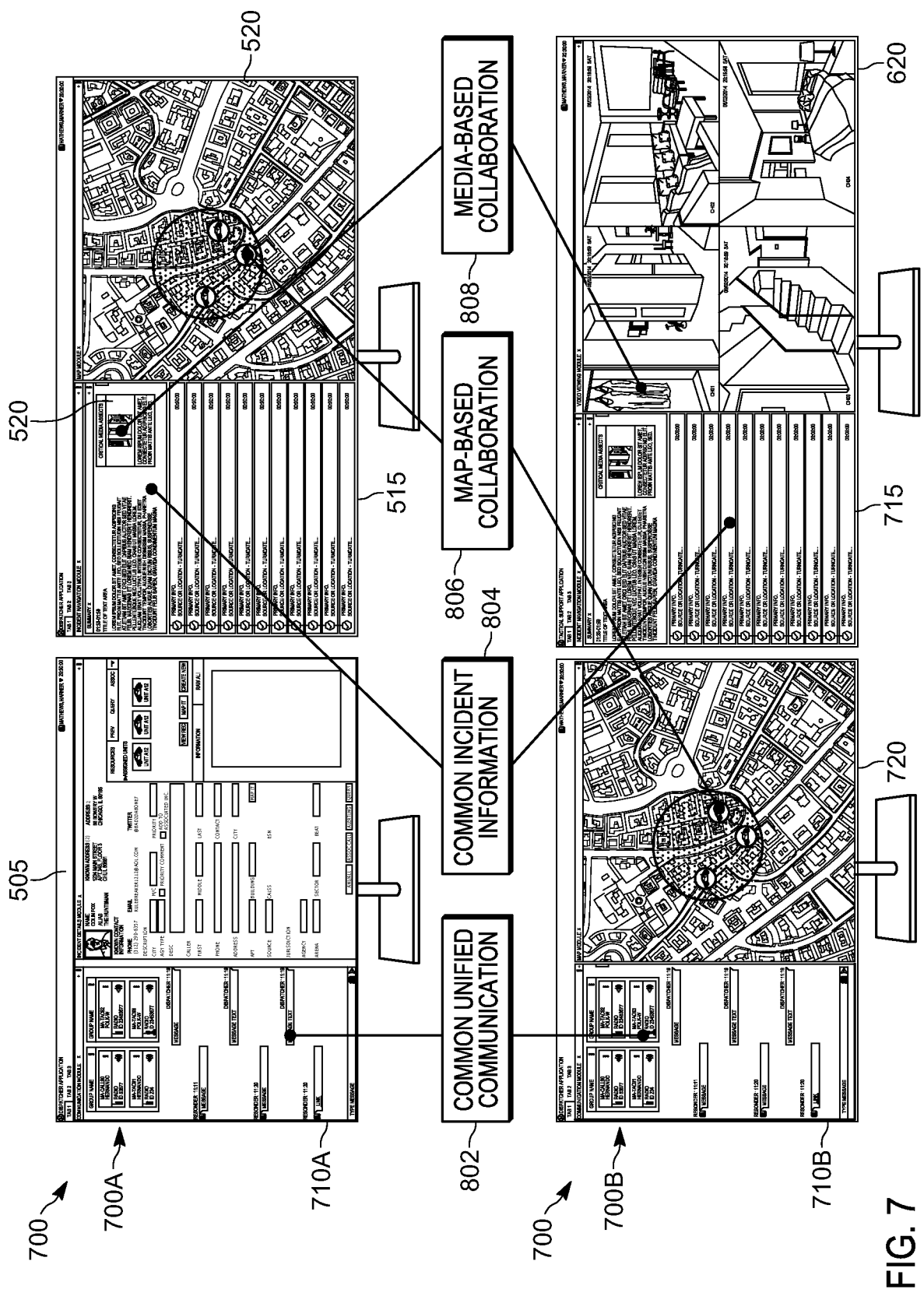
FIG. 7 illustrates a graphical user collaborative interface of at least two workstations of the communication system of FIG. 1 according to one example embodiment.

FIGS. 5-7 illustrate several graphical user interfaces according to some embodiments. FIGS. 5-6 each illustrate an example graphical user interface displayed on a workstation 110 when the workstation 110 is not participating in collaborative work session (or, in some embodiments, the user of the workstation 110 does not have authorization for any resources provided via the collaborative work session). FIG. 7 illustrates both interfaces of FIG. 5 and FIG. 6 when the workstations 110 presenting the respective user interface are participating together in a collaborative work session.

FIGS. 5 and 6 each illustrate an interface according to a role of the user, specifically a dispatcher and an intelligence analyst, respectively. For ease of description, in regard to the examples described below, the interface 500 of FIG. 5 and interface 700A of FIG. 7 are described as being presented on the display 230 of the first workstation 110A where the user of the workstation 110A is a dispatcher. The interface 600 of FIG. 6 and interface 700A of FIG. 7 are described as being presented on the display 230 of the second workstation 110B where the user of the workstation 110B is an intelligence analyst.

FIG. 5 illustrates a graphical user interface 500 displayed on the display 230 of a workstation 110 according to one example embodiment. In the example shown, the interface 500 of the workstation 110 is configured for use by a public safety or emergency dispatcher. In the example shown, the graphical user interface 500 includes an incident information window or textbox 505, a communications textbox 510, an incident summary and timeline 515, an incident media window 520, and an incident map window 525. The incident information textbox 505 displays detailed information about the incident being handled by the user of the workstation 110. For example, the incident information textbox 505 displays the incident type, the incident location, contact information of involved personnel, and the like. The communications textbox 510 includes available contacts, active contacts, or both as well as talkgroups the dispatcher is able to contact and/or a list of available audio/textual data feeds from a plurality of the one or more communication devices 115. For example, the list of available data feeds includes information relating to each communication device 115 such as data source information (for example, officer 1 body camera, civilian 1 phone, and the like) and location information. In some embodiments, the list of available data feeds includes a scroll bar to show additional available data feeds in response to user input. The incident summary and timeline 515 includes a brief summary of the incident and a detailed timeline of events of the incident, including the time of the initial alert and all subsequent actions taken by public safety personnel. The incident media window 520 presents one or more video data feeds and visual images (for example, videos or images received from the one or more communication devices 115 that are related to the incident). The incident map window 525 provides a map illustrating the location of the incident as well as, in some embodiments, the location of one or more public safety personnel responding to the incident. The graphical user interface 500 of FIG. 5 (as well as the additional graphical user interfaces described below in regard to FIG. 6 and FIG. 7) is merely an example and may include fewer or additional elements or components and, in some embodiments, the components are arranged in a different manner and the arrangement of each component may be user configurable.

FIG. 6 illustrates a graphical user interface 600 displayed on the display 230 of a workstation 110 according to one example embodiment. In the example shown, the interface 600 of the workstation 110 is configured for use by an intelligence analyst. In the example shown, the graphical user interface 600 includes a monitoring sensor map 605, a communications textbox 610, an event monitor textbox 615, and a monitoring sensor media window 620. The monitoring sensor map 605 displays the locations of one or more monitoring sensors (for example, a camera, video camera, and a microphone) in a specified area or location communicatively coupled to the workstation 110. In the example shown, the communications textbox 610 includes available contacts and a list of available audio and data feeds from the communication devices 115. The list of available data feeds includes, for example, information relating to each communication device 115. This information may include data source information (for example, officer 1 body camera, civilian 1 phone, and the like) and location information. In some embodiments, the list of available data feeds includes a scroll bar to provide a user-selectable mechanism to change the viewable portion of the list. The event monitor textbox 615 includes a brief summary of incidents that have occurred in the specified area or location and a detailed timeline of the incidents, including the time of the initial alert and all subsequent actions taken by public safety personnel. The monitoring sensor media window 620 presents one or more video data feeds and visual images (for example, videos or images received from the one or more monitoring devices).

FIG. 7 illustrates example collaboration interfaces 700A and 700B of an established collaborative work session according to some embodiments. In the following description, when explaining how a single collaborative interface functions, a reference to collaborative interface 700 is used. The collaboration interface 700 is the interface generated or caused to be modified by the monitoring computer 105 and displayed at one or more workstations 110 participating in the same collaborative work session. The collaboration interfaces 700A and 700B of FIG. 7 are the collaborative interfaces generated at or caused to be modified by the monitoring computer 105 and displayed at workstations 110A and 110B respectively, instead of the interfaces 500 and 600, when the workstations 110A and 110B are both participating together in a collaborative work session.

In some embodiments, the components as well as the layout of the interfaces of one or more of the workstations 110 participating in a collaborative work session may be modified including what resources of the collaborative work session the workstation 110 has access to (for example, incident records and details, contacts, data feeds, and related media). The modification may include modifying one or more components of the interface of one workstation 110 to resemble (and, in some cases, duplicate) one or more components of another interface at another workstation 110 participating in the collaborative work session. In further embodiments, the modification of the interface 700 may be based on the role of the user of the workstation 110 (dispatcher, intelligence analyst, call-taker, etc.). In further embodiments, the monitoring computer 105 may be configured to adjust an accessibility of the workstation 110 to one or more resources of the collaborative work session. The monitoring computer 105 may also affect the interface of the collaborative work session participating workstations 110 based on additional factors, (for example, those described above in regard to the determination of the collaboration recommendation). Depending on the authorization level and, in some cases, the role of the user, the interface of a workstation 110 participating in the collaborative work session may not be modified or the workstation 110 may be given only partial or no access to the one or more resources of the collaborative work session. In some embodiments, the collaboration interface 700 of a workstation 110 participating in a collaborative work session is the same as the collaboration interface 700 of one or more other workstations 110 of the collaborative work session. In other embodiments, the layout of the collaborative interface 700 is based on one or more provisioning settings or user settings (for example, set up by the user or provider of the workstation 110).

For example, as illustrated in FIG. 7, the layout of the collaboration interface 700A of the workstation 110A is similar to that the interface 500 because the role of the user of the workstation is a dispatcher, which entails primary incident management. The generated and modified textboxes of the interface 700 provided in the collaborative work session allow two or more users common access to one or more kinds of resources. For example, the collaborative work session provides one or more of a common unified communication 802, common incident information 804, map-based collaboration 806, and media-based collaboration 808. For example, to provide a common unified communication 802 between the dispatcher and intelligence analyst, the communications textbox 710A is generated or modified to enable the dispatcher to communicate with the intelligence analyst of the workstation 110B via a same interface used to communicate with other incident resources (for example, via an audio and/or visual communication interface including a push to talk (PTT) call session). Continuing the example, the dispatcher and the intelligence analyst may each be given access to assigned resources of the other (for example, access to one or more contacts, communication groups, or talk groups). This allows the user (in one example, the dispatcher) to communicate directly with a talk group that (outside of the collaborative work session) is assigned only to (continuing the example) the intelligence analyst.

With respect to the interface 700B, the layout of the collaboration interface 700B of the workstation 110B remains substantially the same, but several components of the layout are newly generated or modified. For example, as shown in the interface 700B (compared to the interface 600 of FIG. 6), the communications textbox 610 is newly generated or modified to an incident group communications textbox 710B (similar to the contacts and textual feed of the communications textbox 510 illustrated in FIG. 5) to provide a shared, common unified communication 802. To provide common incident information 804, the event monitor textbox 615 (shown in FIG. 6) is replaced with an incident summary and timeline 715 (similar to the display in the incident summary timeline 515 of FIG. 5). The intelligence analyst is then able to see and edit the same incident information record as the dispatcher. The collaborative work session, in the illustrated embodiment, provides the map-based collaboration 806 by regenerating or modifying the monitoring sensor map 605 to display the incident area in an incident media window 720 (similar to the display in the incident media window 520 in FIG. 5). The intelligence analyst and the dispatcher are thus able to view the same map relative to the incident as well as additional relative information such as a location of the one or more responders handling the incident. The collaborative work session provides media based collaboration 808 by displaying one or more of the same datafeed(s) in the interfaces 700A and 700B. In the illustrated embodiment, the monitoring sensor media window 620 is modified to include an image feed from one or more incident cameras (proximate to the incident the dispatcher and the intelligence analyst are to handle together in the collaborative work session) in an incident media window 720 (shown in the incident media window 520 in FIG. 5). As also shown in the interface 700A, the dispatcher now is able to view a data feed from one of the incident cameras (now shown in the incident media window 520) that the dispatcher previously did not have access to. This allows the dispatcher a better visual and understanding of the particular incident and therefore allows the dispatcher to more effectively work together with the intelligence analyst to handle the incident.

In some embodiments, the users of the workstations 110A and 110B are able to collaborate with each other, in addition to via the common communications windows or textboxes 710A and 710B, by adding incident notes and annotations over the collaboration interface 700 (for example, via the one or more input devices 235 of the workstation 110). This allows the users of the workstations 110A and 110B to further effectively communicate and collaborate to effectively handle an incident together.

While a number of the embodiments and examples described above relate to public safety officers handling a public safety incident, in some embodiments, the disclosed methods, devices, and systems are used in other contexts. For example, the disclosed methods, devices, and systems may be used by a security company or in a retail store or a warehouse and the workstations 110 may be used by security guards or employees. As another example, the disclosed methods, devices, and systems may be used by medical personnel in, for example, a hospital. As another example, the disclosed methods, devices, and systems may be used by miners at a mine, oil field, or precious metal or gem field. As another example, the disclosed methods, devices, and systems may be used by air traffic controllers at an airport. In other words, the disclosed methods, devices, and systems may be used in any situation in which it may be useful to determine when a user of at a workstation 110 and a user of a another workstation 110 would potentially benefit from working together via a shared collaborative graphic interface (for example, when they are working on the same incident).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A collaborative work environment system for handling public safety communications, the system comprising:
 a monitoring computer communicatively coupled to a first computer-aided workstation and a second computer-aided workstation, the monitoring computer including an electronic processor configured to:
  receive, from the first computer-aided workstation, a first datastream associated with a first incident,
  receive, from the second computer-aided workstation, a second datastream associated with at least one selected from the group consisting of a second incident and a user of the second computer-aided workstation,
  analyze each of the first datastream and the second datastream to determine whether a user of the first computer-aided workstation and a user of the second computer-aided workstation are working on the same incident,
  determine, using an algorithm and in response to determining that the first incident and the second incident are the same incident, a collaboration recommendation between the first computer-aided workstation and the second computer-aided workstation,
  transmit, to the first computer-aided workstation, a first request to participate in a collaborative work session and, to the second computer-aided workstation, a second request to participate in the collaborative work session in response to determining the collaboration recommendation, generate the collaborative work session by modifying a user interface of at least one selected from the first computer-aided workstation and the second computer-aided workstation to provide one or more of a common audio element and a common graphic element, detect when the first computer-aided workstation or the second computer-aided workstation exits the collaborative work session, analyze a reason for the first computer-aided workstation or the second computer-aided workstation exiting the collaborative work session, and modify the algorithm used to make the determination of the collaboration recommendation based on the reason.

2. The system of claim 1, wherein the electronic processor is further configured to receive, from the first computer-aided workstation an acceptance to the first request and, from the second computer-aided workstation, an acceptance to the second request, and generate, in response to receiving the acceptance to the first request and the acceptance to the second request, the collaborative work session between the first computer-aided workstation and the second computer-aided workstation.

3. The system of claim 1, wherein at least one of the first datastream and the second datastream includes at least one selected from the group consisting of user information, incident information, and data feed information.

4. The system of claim 1, wherein the collaboration recommendation is based on an incident workload of the first computer-aided workstation exceeding a maximum handling incident number threshold and an incident workload of the second computer-aided workstation being below a minimum handling incident number threshold.

5. The system of claim 1, wherein the collaboration recommendation is based on an incident content, and wherein the incident content includes at least one selected from the group consisting of an incident type, a scale of an incident, a data feed content related to the incident, and a location of the incident.

6. The system of claim 4, wherein the incident workload of the first computer-aided workstation includes at least one selected from the group consisting of a workload of a first command center that the first computer-aided workstation is associated with and a workload of the first user of the first computer-aided workstation, and wherein the incident workload of the second computer-aided workstation includes at least one selected from the group consisting of a workload of a second command center that the second computer-aided workstation is associated with and a workload of the user of the second computer-aided workstation.

7. The system of claim 1, wherein the first request includes incident-related information from the second datastream and the second request includes incident-related information from the first datastream.

8. The system of claim 1, wherein the first computer-aided workstation and the second computer-aided workstation are communicatively coupled to a common command center.

9. The system of claim 1, wherein the first computer-aided workstation is communicatively coupled to a first command center and the second computer-aided workstation is communicatively coupled to a second command center different from the first command center.

10. The system of claim 1, wherein the electronic processor is further configured to:

determine an authorization level of the first computer-aided workstation and the second computer-aided workstation, and adjust an accessibility of at least one of the first computer-aided workstation and the second computer-aided workstation to one or more resources of the collaborative work session based on the authorization level of the respective computer-aided workstation.

11. The system of claim 1, wherein the collaborative work session includes providing at least one selected from the group consisting of the first computer-aided workstation and the second computer-aided workstation access to a communication group associated with a user of another computer-aided workstation participating in the collaborative work session.

12. The system of claim 1, wherein the electronic processor is further configured to:

analyze a reason for at least one of the first computer-aided workstation and the second computer-aided workstation rejecting the respective request, and modify a stored mapping or machine learning neural network associated with the determination of the collaboration recommendation based on the reason.

13. A method for providing a collaborative work environment system for handling public safety communications between a first computer-aided workstation and a second computer-aided workstation, the method comprising:

receiving, from the first computer-aided workstation, a first datastream associated with a first incident;

receiving, from the second computer-aided workstation, a second datastream associated with at least one selected from the group consisting of a second incident and a user of the second computer-aided workstation;

analyzing, via an electronic processor, each of the first datastream and the second datastream to determine whether a user of the first computer-aided workstation and a user of the second computer-aided workstation are working on the same incident, determining, using an algorithm and in response to determining that the first incident and the second incident are the same incident, a collaboration recommendation between the first computer-aided workstation and the second computer-aided workstation;

transmitting, to the first computer-aided workstation, a first request to participate in a collaborative work session, and, to the second computer-aided workstation, a second request to participate in the collaborative work session in response to determining the collaboration recommendation;

generating, with the electronic processor, the collaborative work session by modifying a user interface of at least one selected from the first computer-aided workstation and the second computer-aided workstation to provide one or more of a common audio element and a common graphic element, detecting when the first computer-aided workstation or the second computer-aided workstation exits the collaborative work session prematurely, analyzing a reason for the first computer-aided workstation or the second computer-aided workstation exiting the collaborative work session, and modifying the algorithm used to make the determination of the collaboration recommendation based on the reason.

14. The method of claim 13 further comprising:
receiving, from the first computer-aided workstation an acceptance to the first request and, from the second computer-aided workstation, an acceptance to the second request, and
generating, in response to receiving the acceptance to the first request and the acceptance to the second request, the collaborative work session between the first computer-aided workstation and the second computer-aided workstation.

15. The method of claim 13, wherein the first request includes incident-related information from the second datastream and the second request includes incident-related information from the first datastream.

16. The method of claim 13, wherein at least one of the first datastream and the second datastream includes at least one selected from the group consisting of user information, incident information, and data feed information.

17. The method of claim 13, wherein the collaboration recommendation is based on an incident workload of the first computer-aided workstation exceeding a maximum handling incident number threshold and an incident workload of the second computer-aided workstation being below a minimum handling incident number threshold.

18. The method of claim 13 further comprising:
determining an authorization level of the first computer-aided workstation and the second computer-aided workstation, and
adjusting an accessibility of at least one of the first computer-aided workstation and the second computer-aided workstation to one or more resources of the collaborative work session based on the authorization level of the respective computer-aided workstation.

19. A non-transitory computer-readable medium including instructions executable by an electronic processor to perform a set of functions, the set of functions comprising:
receiving, from a first computer-aided workstation, a first datastream associated with a first incident;
receiving, from a second computer-aided workstation, a second datastream associated with a second incident;
analyzing, via the electronic processor, each of the first datastream and the second datastream to determine whether a user of the first computer-aided workstation and a user of the second computer-aided workstation are working on the same incident;
determining, using an algorithm and in response to determining that the first incident and the second incident are the same incident, a collaboration recommendation between the first computer-aided workstation and the second computer-aided workstation;
transmitting, to the first computer-aided workstation, a first request to participate in a collaborative work session, and, to the second computer-aided workstation, a second request to participate in the collaborative work session in response to determining the collaboration recommendation;
generating the collaborative work session by modifying a user interface of at least one selected from the first computer-aided workstation and the second computer-aided workstation to provide one or both of a common audio element and a common graphic element,
detecting when the first computer-aided workstation or the second computer-aided workstation exits the collaborative work session,
analyzing a reason for the first computer-aided workstation or the second computer-aided workstation exiting the collaborative work session, and
modifying the algorithm used to make the determination of the collaboration recommendation based on the reason.

* * * * *